United States Patent

[11] 3,607,494

| [72] | Inventor | Leroy J. Rowland<br>Charleston, S.C. |
|---|---|---|
| [21] | Appl. No. | 832,973 |
| [22] | Filed | June 13, 1969 |
| [45] | Patented | Sept. 21, 1971 |
| [73] | Assignee | Rowland Enterprises, Inc.<br>Charleston, S.C. |

[54] METHOD OF FORMING A COATED ROLL
5 Claims, 6 Drawing Figs.

[52] U.S. Cl. .................................................. 156/86,
156/230, 156/244, 156/247, 156/287
[51] Int. Cl. ...................................................... B32b 31/30,
B32b 31/12
[50] Field of Search ......................................... 156/242,
247, 287, 293, 156, 165, 84, 86

[56] References Cited
UNITED STATES PATENTS

| 2,440,725 | 5/1948 | Munger ........................ | 156/287 X |
| 2,993,820 | 7/1961 | Marshall ...................... | 156/86 X |
| 3,011,219 | 12/1961 | Williams ....................... | 156/247 |
| 3,211,598 | 10/1965 | O'Brian, Jr. .................. | 156/86 |
| 3,225,129 | 12/1965 | Taylor et al. ................. | 156/86 X |

Primary Examiner—Benjamin R. Padgett
Assistant Examiner—Roger S. Gaither
Attorney—T. Russell Foster ABSTRACT: A method of forming a coated roll having a body and an outer layer of coating material which comprises positioning a tubular sleeve of release material, having on its inner surface a layer of coating material, in surrounding relationship with the body, compressing the layer of coating material to bond the layer to the outer surface of the body and subsequently removing the tubular sleeve.

PATENTED SEP 21 1971　　　3,607,494
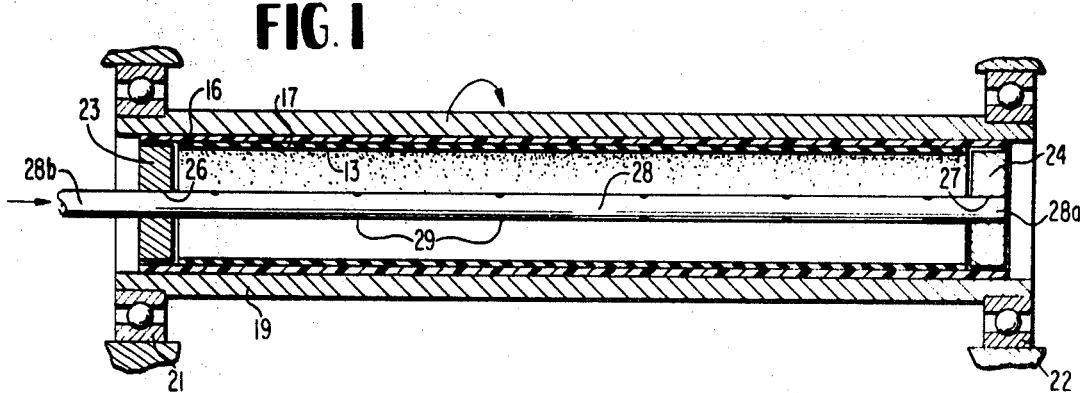
FIG. 1
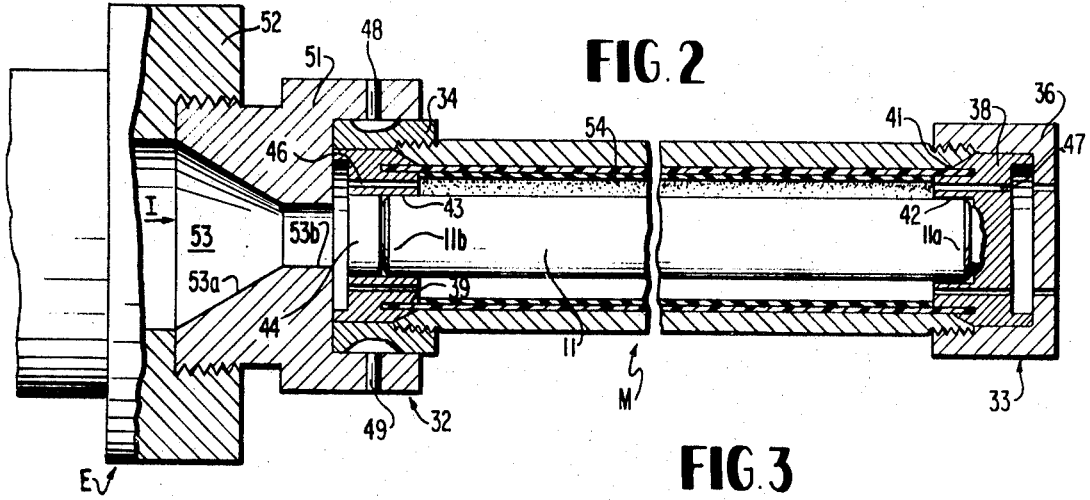
FIG. 2
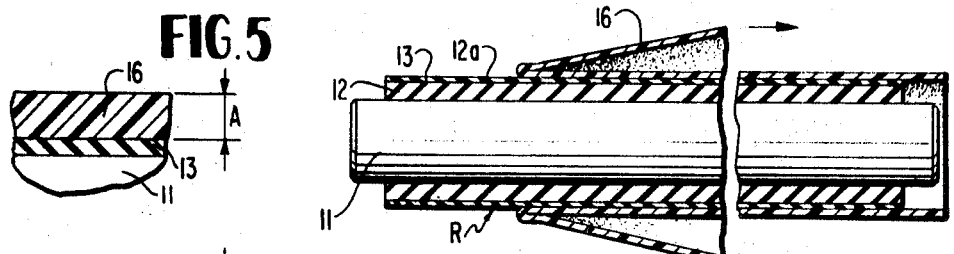
FIG. 3
FIG. 5
FIG. 6
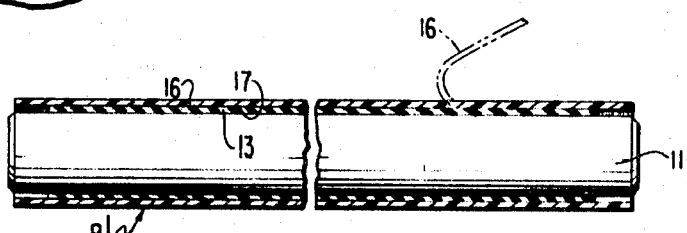
FIG. 4
INVENTOR
LEROY J. ROWLAND
BY T. Russell Foster
ATTORNEY

METHOD OF FORMING A COATED ROLL

The invention relates to a coated roll and more particularly to a method of coating a rubber roll.

Rolls of many types are in widespread use today in many industries such as the paper industry, printing industry, textile industry and the like. Such rolls are usually adapted for a specific use and one of the most significant structural features for adapting such rolls to a specific use is the provision of an outer layer of material having certain physical and chemical properties on the roll. For instance, in the copending application of the inventor herein entitled "Method and Apparatus for Making a Sleeved Elastomeric Roll," Ser. No. 802,046, filed Feb. 25, 1969, a rubber roll is provided having an outer surface comprising a relatively thin sleeve of plastic material such as polytetrafluoroethylene or "Teflon" to adapt such as roll to a particular use in the field of "Xerography." The mold employed in the aforementioned patent application may be used in carrying out one embodiment of the method of this invention and reference will be made hereinafter to this copending application. Such a rubber roll as described and claimed in this copending application is generally referred to as a "fuser roll."

In another type of rubber roll also used in the field "xerography", a relatively thick layer of elastomeric material such as silicone rubber is provided on a metal core. Although such silicone rubber rolls perform satisfactory for their intended purpose, in certain processes it is desirable to provide an outer surface of special elastomeric material on such rubber rolls. With the use of only a limited amount of such special elastomeric material on the outer surface of such as roll, an underlying layer of silicone rubber may be used on the roll therefore providing the desired physical and chemical properties of the material on the outer surface of the roll.

One such example of such special elastomeric material is a relatively new material or rubber manufactured by Dow Corning being of a type referred to as R.T.V. (Room Temperature Vulcanization) and sold by Dow Corning under the designation "DC 236 Dispersion." This special elastomeric material is extremely high in cost but has outstanding characteristics which make it ideally suited for use in forming the outer surface of such a roll. As can be understood, in the formation of such a rubber roll, the use of readily available, inexpensive elastomeric material or silicone rubber to form the underlying layer of material substantially reduces the cost of such a rubber roll while a roll having the desired characteristics is obtained.

Although it is or prime importance in such fields as "zerography" to provide such a coated rubber roll which is of uniform concentricity throughout and which has an outer diameter which is controlled within precise limits, the formation of such a coating material on the roll has posed considerable difficulty as not only is a problem presented in adhering such an outer surface rubber layer to the underlying body but the techniques available today for applying such a relatively thin coating make it virtually impossible to obtain the desired degree of uniformity of outer diameter and concentricity on the roll.

Accordingly, a primary object of this invention is to provide a new and novel method for forming a coated roll.

Another object of this invention is to provide a new and novel method of applying and securely bonding a layer of coating material to the outer surface of a body of any material.

A further object of this invention is to provide a new and novel method of forming a coated roll which permits an outer layer of relatively expensive coating material to be securely bonded to the outer surface of a body and over a wide range of thicknesses so as to conserve material and at the same time to provide an outer diameter on the roll which is virtually free of variation and which conforms precisely to the selected outer diameter.

This invention further contemplates the provision of a new and novel method of forming a coated roll which is inexpensive to operate, which may be performed at a high production rate and which permits the application of an extremely thin layer of relatively expensive elastomeric material to an underlying rubber layer to provide a surface layer on the roll having a uniform thickness, concentricity and smoothness throughout.

Still another object of this invention is to provide a new and novel method of providing a thin layer of one type of a special elastomeric material having selected physical and chemical properties on a substrate of elastomeric material of another type to form a permanently bonded, multilayered structure.

Other objects and advantages of the invention will become apparent from the following description taken in connection with the accompanying drawings.

The objects of this invention and other related objects are accomplished by providing a body of circular cross-sectional shape having an outer surface for receiving a layer of coating material. A tubular sleeve of release material such as polytetrafluoroethylene is provided to the inner surface of which is applied the coating material which is to be applied to the body outer surface. The coated sleeve is positioned in surrounding coaxial relationship with the body and the layer of coating material is compressed between the sleeve and the body to bond the coating material to the body outer surface following which the sleeve is removed from the coated body to form the coated roll of the invention.

The novel features which are believed to be characteristic of the invention are set forth with particularity in the appended claims. The invention itself, however, both as to its organization and method of operation may be best understood by reference to the following description taken in conjunction with the accompanying drawings in which:

FIG. 1 is a sectional view of an apparatus utilized to carry out one step in the novel method of the invention;

FIG. 2 is a sectional view broken away of a mold used in carrying out one embodiment of the novel method of the invention;

FIG. 3 is a sectional view of a coated roll formed in the apparatus of FIG. 2 illustrating the final step in the novel method of the invention; and FIG. 4 is a sectional view of another embodiment of a coated roll at an intermediate step in the novel method of the invention;

FIG. 5 is a fragmentary view of a portion of a coated roll formed in accordance with the embodiment of FIG. 4 at an intermediate step in the novel method of the invention; and FIG. 6 is a fragmentary view similar to FIG. 5 illustrating the final condition of the coated roll produced by the novel method of the invention.

Referring now to the drawings and to FIG. 3 in particular, there is shown one embodiment of the coated roll produced by the method of the invention at an intermediate step of the method. In the embodiment of FIG. 3, the coated roll is designated generally by the letter R. The coated roll R includes a tubular core 11 of metal or the like on the outer surface of which is bonded an intermediate layer 12 of relatively thick, inexpensive elastomeric material to which is bonded a relatively thin layer 13 of high cost elastomeric material having desired physical and chemical properties such as the aforementioned Dow Corning "DC 236 Dispersion material." As has been previously referred to, such a coated roll R is highly suitable for use in the field "Xerography."

Referring now to FIG. 1, a lamina or tubular sleeve 16 of release material and, in particular, a synthetic resinous material such as nylon, polytetrafluoroethylene or the like having an inner surface 17 is provided. A layer 13 of elastomeric coating material and, in particular, an elastomeric coating material such as the aforementioned "Dow Corning R.T.V." rubber is applied to the sleeve inner surface 17. Any suitable technique may be employed for applying the coating material 13 to the inner surface 17 of the sleeve 16 such as spraying, dipping or the like and FIG. 1 shows one type of apparatus for this coating operation. In the apparatus of FIG. 1, the tubular sleeve 16 is snugly positioned within a tubular mold 19 of metal or the like rotatably supported at opposite ends by means such as bearings 21, 22. End caps 23, 24 having central bores 26, 27 respectively are inserted in snug-fitting relationship within the ends of the sleeve 16 to define the terminal ends of the layer 13.

A conduit 28 provided with a plurality of radial ports or openings 29 arranged in longitudinally spaced, circumferentially extending relationship is positioned within the bores 26, 27 of the end caps 23, 24 respectively as shown. The end 28a of the conduit 28 adjacent the end cap 24 is closed by suitable means (not shown) and the other end 28b of the conduit 28 is arranged in communication with a source (not shown) of elastomeric coating material. By suitable rotating means (not shown), the tubular mold 19 is rotated and the elastomeric coating material introduced into the conduit 28 so that it is ejected radially outward in the form of a spray through the conduit ports 29 for coating the inner surface 17 of the sleeve 16 in a uniform manner to form the layer 13.

In the next step in the novel method of the invention, the sleeve 16 having the layer 13 of elastomeric coating material on its inner surface 17 is positioned within a mold designated generally by the letter M as shown in FIG. 2. The mold is detachably mounted on an extruder designated generally by the letter E both the mold M and extruder E being of a construction substantially identical to that shown in the aforementioned copending patent application. The mold M includes a tubular casing 31 having an inner diameter for snugly accommodating the sleeve 17 and arranged to be closed at each end with a screw-threaded connection by a pair of closure members designated generally by the numerals 32, 33. The closure members 32, 33 include end caps 34, 36 and plug members 37, 38 having annular recesses 39, 41 respectively for accommodating the ends of the tubular sleeve 16 as shown in FIG. 2.

Plug member 38 is provided with a recess 42 for accommodating the end 11a of the core 11 and plug member 37 is provided with a central bore 43 for accommodating the end 11b of the core 11 and a guide member 44. The plug members 37, 38 are also provided with ports 46, 47 respectively.

The mold M is arranged to be mounted on the extruder E with includes lugs 48 receivable within slots 49 in an adapter 51 secured by a screw-threaded connection to the plate 52 of the adapter E. The adapter 51 includes a central passage 53 having a tapered portion 53a and a straight portion 53b for conducting elastomeric material flowing in the direction of the arrow I from the extruder E into the mold M to fill the cavity 54 defined by the core 11 and the layer 13 of coating material on the sleeve.

In the next step of the novel method of the invention, elastomeric material such as silicone rubber is introduced into the mold cavity 54 from the extruder E to fill the cavity 54 to provide a silicone rubber underlying layer 12 or substrate which in combination with the core 11 form a body having an outer surface 12a to be coated with the layer 13 of elastomeric coating material. The pressure of the material forming the silicone rubber layer 12 compresses the layer 13 between the sleeve 16 and body formed by the core 11 and layer 12 thereby bonding permanently the layer 13 to the outer surface 12a of the silicone rubber layer 12.

Referring now to FIG. 3, the silicone rubber layer 12 may then be vulcanized in any suitable manner by removing the mold M from the extruder adapter 51 and positioning the mold M in a suitable vulcanizing apparatus. However, the silicone rubber layer 12 and outer rubber layer 13 may be of the type which vulcanizes at room temperature thereby eliminating the need for a subsequent vulcanizing operation.

The body formed by the core 11 and silicone rubber layer 12 to which the layer of coating material 13 is now bonded together with the sleeve 16 is then removed from the mold M and the sleeve 16 removed from the layer 13 by a peeling operation or the like as shown in FIG. 3. As the sleeve 18 is formed of release material such as polytetrafluoroethylene or the like, the sleeve 16 is easily removed as there is no bonding action between the sleeve 16 and the layer 13 so as to produce the coated roll R of FIG. 3 having the layer 13 of elastomeric material bonded permanently to the underlying silicone rubber layer 12 in turn bonded permanently to the core 11.

Referring now to FIGS. 4–6, there is shown another embodiment of a coated roll designated generally by the letter R' which is produced in accordance with the invention. In the embodiment of FIGS. 4–6 and referring specifically to FIG. 4, a sleeve 16 of release material such as polytetrafluoroethylene or the like has its inner surface 17 coated with a layer of elastomeric coating material 13 in any suitable manner such as described with reference to the embodiment of FIGS. 1–3, the materials of both the layer 13 and sleeve 16 being preferably identical to those of the previously described embodiment. The inner diameter of the sleeve 16 and thickness of the layer 13 is selected so as to permit the core 11 to be loosely accommodated within the coated sleeve 16 as shown in FIG. 4, the relationship between the sleeve 16, layer 13 and core 11 being shown in FIG. 5 with the thickness of the sleeve 16 being designated by the letter A.

The sleeve 16 is then subjected to a heating operation which may be carried out by any suitable means such as an oven or the like (not shown). As a result of the shrinkage property of the material of the sleeve 16, the sleeve 16 shrinks in the well-known manner reducing its thickness to the dimension identified by the letter B in FIG. 6 so as to compress the layer 13 of elastomeric coating material between the sleeve 16 and the outer surface 11a of the core 11 permanently bonding the layer 13 to the core. The sleeve 16 may then be removed by a peeling operation or the like as shown in FIG. 4 to form the coated roll R' comprising the core 11 having a layer 13 of elastomeric coating material on its outer surface.

It can be seen that there has been provided with the novel method of this invention a simple and inexpensive arrangement for providing a coating of any selected material on a substrate in which the coating is not only extremely uniform in thickness but which follows precisely the contours of the outer surface of the substrate or shaped body to which the coating is applied. The process of the invention lends itself to the coating of a substrate of any surface configuration any may be carried out using conventional apparatus and at a high production rate. An outstanding feature of this invention is its use in the coating of rubber rolls wherein the shaped body or substrate may be a rubber roll having a layer of relatively inexpensive elastomeric material such as silicone rubber or the like. By means of the invention, a relatively thin outer layer of extremely expensive elastomeric material having preselected chemical and physical properties may be permanently bonded to the silicone rubber layer without the use of adhesives to provide a rubber roll in which the characteristics of the expensive outer rubber layer are obtained without the high cost of forming the entire rubber layer on the core from this expensive elastomeric material. Furthermore, the elastomeric material or rubber utilized to form the coated roll of the invention may be of the type which vulcanizes at room temperature or, if desired, may be of the type which may be subjected to a subsequent vulcanizing operation for curing.

While there has been described what at present is considered to be the preferred embodiment of the invention, it will be understood by those skilled in the art that various changes and modifications may be made without departing from the invention.

Having thus described the invention, what is claimed is:

1. A method of forming a coated roller comprising the steps of: providing a roller shaped body of circular cross section to be coated, providing a tubular sleeve-shaped lamina formed of a synthetic resinous release material and having an inner surface, applying a layer of coating material to said lamina inner surface, positioning said roller-shaped body within said coated tubular sleeve in a coaxial relationship, with said applied layer of coating material adjacent the outer surface of the said roller body, effecting radial movement between said coated lamina and said roller-shaped body by compressing said layer of coating material between said lamina and said roller outer surface, bonding said coating material layer to said roller by said compressing step, and removing said releasable lamina from said roller to provide a coated roller.

2. A method in accordance with claim 1 wherein said body includes a core and include the steps of introducing an elastomeric material between said core and said surrounding coated tubular sleeve and restraining said tubular sleeve from radially outward movement during said introducing step, and wherein said relative movement effecting step comprises forcing said introduced elastomeric material against said layer of coating material on said sleeve to bond said coating material layer to the underlying introduced elastomeric material.

3. A method in accordance with claim 1 wherein said tubular sleeve is formed of polytetrafluoroethylene.

4. A method in accordance with claim 2 wherein said layer of coating material comprises an elastomeric material.

5. A method in accordance with claim 1 wherein said roller comprises a rigid material and wherein said tubular sleeve is formed of polytetrafluoroethylene and including the step of heat shrinking said coated tubular sleeve into bonding engagement with the outer surface of said roller to compress said coating material layer and bond said layer to the outer surface of said roller.